(12) United States Patent
Okabe

(10) Patent No.: US 12,542,290 B2
(45) Date of Patent: Feb. 3, 2026

(54) FUEL CELL SYSTEM

(71) Applicant: HONDA MOTOR CO., LTD., Tokyo (JP)

(72) Inventor: Yuta Okabe, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 475 days.

(21) Appl. No.: 18/072,943

(22) Filed: Dec. 1, 2022

(65) Prior Publication Data

US 2023/0187668 A1    Jun. 15, 2023

(30) Foreign Application Priority Data

Dec. 9, 2021  (JP) ................................ 2021-199733

(51) Int. Cl.
*H01M 8/04746* (2016.01)
*H01M 8/04082* (2016.01)
*H01M 8/0444* (2016.01)
*H01M 8/2457* (2016.01)

(52) U.S. Cl.
CPC ... *H01M 8/04753* (2013.01); *H01M 8/04201* (2013.01); *H01M 8/04447* (2013.01); *H01M 8/2457* (2016.02)

(58) Field of Classification Search
CPC ................................................ H01M 8/04753
See application file for complete search history.

(56) References Cited

U.S. PATENT DOCUMENTS

| | | | | |
|---|---|---|---|---|
| 2012/0301798 A1* | 11/2012 | Matsumoto | ....... | H01M 8/04097 429/444 |
| 2021/0028510 A1 | 1/2021 | Munakata et al. | | |

FOREIGN PATENT DOCUMENTS

| | | | | |
|---|---|---|---|---|
| CN | 107710486 A | * | 2/2018 | ........ H01M 8/04201 |
| JP | 2003-132916 A | | 5/2003 | |
| JP | 2007-179949 A | | 7/2007 | |
| JP | 2008-078067 A | | 4/2008 | |
| JP | 2009021076 A | * | 1/2009 | |
| JP | 2009-289426 A | | 12/2009 | |
| JP | 2012-234806 A | | 11/2012 | |
| JP | 2013-008664 A | | 1/2013 | |
| JP | 2020-198780 A | | 12/2020 | |
| WO | WO-2020226190 A1 | * | 11/2020 | ........ H01M 8/04029 |

OTHER PUBLICATIONS

Office Action dated Jul. 25, 2023 issued over the corresponding Japanese Patent Application 2021-199733 with the English machine translation thereof.

* cited by examiner

*Primary Examiner* — Brian R Ohara
(74) *Attorney, Agent, or Firm* — Carrier, Shende & Associates P.C.; Joseph P. Carrier; Jeffrey T. Gedeon

(57) ABSTRACT

A fuel cell system includes a branch flow passage that branches from a supply pipe disposed outside an inner surface of a wall portion of a case enclosing a fuel cell stack, the branch flow passage communicating with the inside of the case. The outlet end of the branch flow passage is provided at a position lower than a ventilation hole in the installed state of the fuel cell system.

8 Claims, 8 Drawing Sheets

FUEL CELL SYSTEM

CROSS-REFERENCE TO RELATED APPLICATIONS

This application is based upon and claims the benefit of priority from Japanese Patent Application No. 2021-199733 filed on Dec. 9, 2021, the contents of which are incorporated herein by reference.

BACKGROUND OF THE INVENTION

Field of the Invention

The present invention relates to a fuel cell system.

Description of the Related Art

The fuel cell system includes a fuel cell stack that generates electric power using hydrogen gas and oxygen-containing gas. The fuel cell stack may be accommodated in a case. For example, JP 2009-289426 A discloses a device for removing liquid water from the inside of a fuel cell case accommodating a fuel cell stack. In this device, air is supplied to the inside of the fuel cell case by a ventilation fan provided outside the fuel cell case, and liquid water inside the fuel cell case is discharged to the outside of the fuel cell case together with ventilation air.

SUMMARY OF THE INVENTION

However, in JP 2009-289426 A, a ventilation fan for ventilating the inside of the fuel cell case is necessary, and the number of components increases. Further, in JP 2009-289426 A, an air flow is formed from the upper side to the lower side of the fuel cell case. However, since a gas lighter than air, such as hydrogen gas, moves upward in the fuel cell case, it is difficult for the gas to be discharged to the outside of the fuel cell case, which is inefficient.

An object of the present invention is to solve the aforementioned problem.

According to an aspect of the present invention, there is provided a fuel cell system comprising: a fuel cell stack configured to generate electric power by an electrochemical reaction between a hydrogen gas and an oxygen-containing gas; a case configured to enclose the fuel cell stack; a supply pipe connected to an oxygen-containing gas supply device provided outside the case and to the fuel cell stack, the supply pipe passing through a wall portion of the case; a branch flow passage configured to branch from the supply pipe disposed outside an inner surface of the wall portion of the case, and communicate with an inside of the case; and a ventilation hole provided in the case and configured to ventilate the inside of the case to release the hydrogen gas. An outlet end of the branch flow passage is provided at a position lower than the ventilation hole in a state where the fuel cell system is installed.

According to the aspect of the present invention, it is possible to efficiently ventilate the inside of the case. Specifically, since the branch flow passage that branches from the supply pipe and communicates with the inside of the case is provided, oxygen-containing gas can be guided to the case without a ventilation fan. In addition, since the outlet end of the branch flow passage is provided at a position lower than the ventilation hole in the state where the fuel cell system is installed, a flow of the oxygen-containing gas from the lower side to the upper side of the case is formed. Therefore, it is possible to efficiently discharge the hydrogen gas, which tends to stay in the upper portion of the case, to the outside of the case.

The above and other objects, features, and advantages of the present invention will become more apparent from the following description when taken in conjunction with the accompanying drawings in which a preferred embodiment of the present invention is shown by way of illustrative example.

DESCRIPTION OF THE INVENTION

Figure 1:
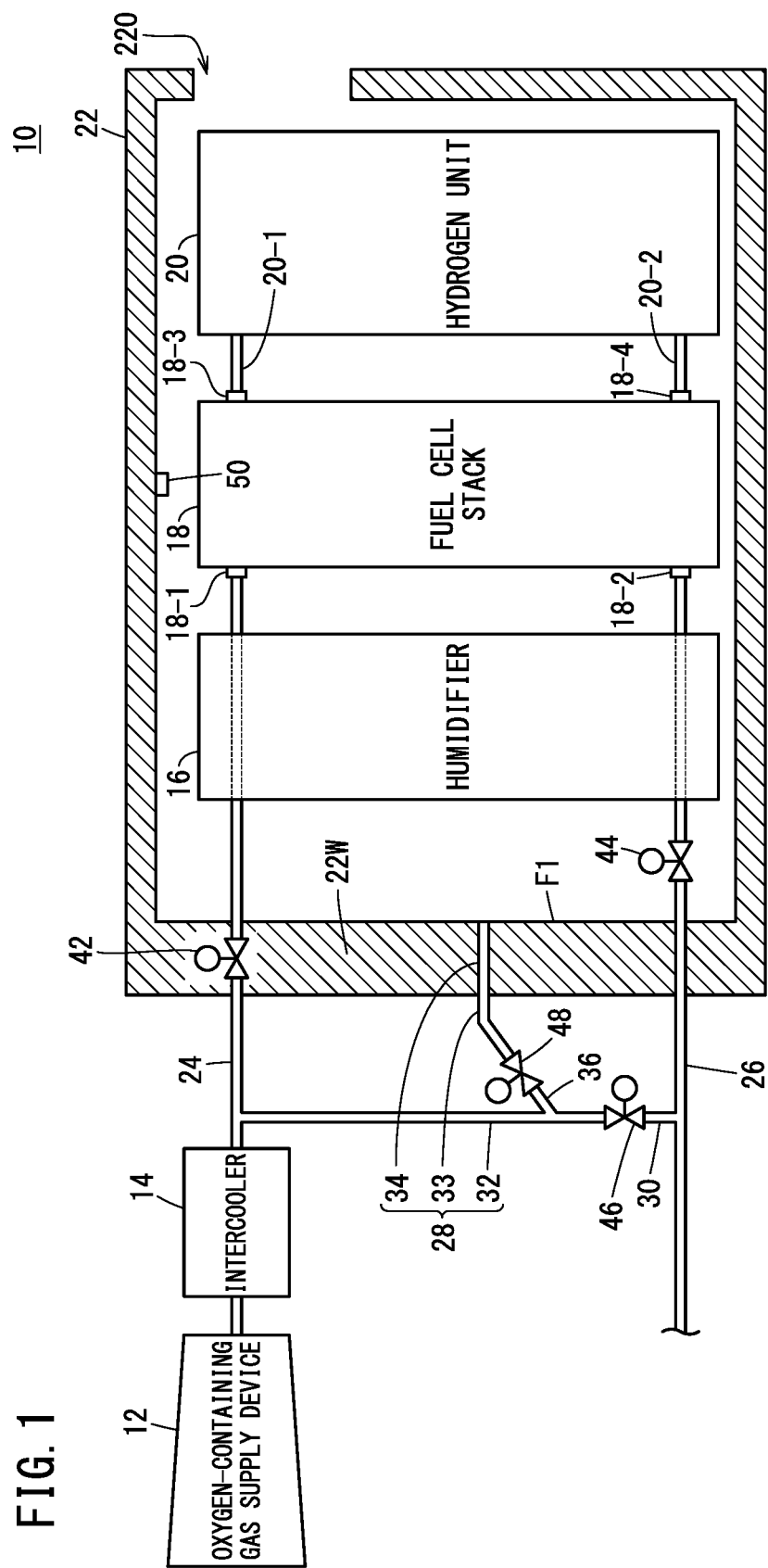
FIG. 1 is a schematic diagram showing a configuration of a fuel cell system according to an embodiment of the present invention.

FIG. 1 is a schematic diagram showing a configuration of a fuel cell system 10 according to an embodiment of the present invention. The fuel cell system 10 includes an oxygen-containing gas supply device 12, an intercooler 14, a humidifier 16, a fuel cell stack 18, a hydrogen unit 20, a case 22, a supply pipe 24, and a discharge pipe 26.

The oxygen-containing gas supply device 12 is provided outside the case 22. The oxygen-containing gas supply device 12 supplies an oxygen-containing gas to the fuel cell stack 18 via the supply pipe 24. Examples of the oxygen-containing gas supply device 12 include a pump, a blower, or the like. Examples of the oxygen-containing gas include air or the like. The oxygen-containing gas is not limited to air as long as it is a gas containing oxygen.

The intercooler 14 is provided outside the case 22. The intercooler 14 cools the oxygen-containing gas flowing through the supply pipe 24. For example, the intercooler 14 is configured to exchange heat with a coolant flowing through a pipe connected to a radiator.

The humidifier 16 is provided inside the case 22. The humidifier 16 introduces water vapor into the supply pipe 24 and humidifies the oxygen-containing gas flowing through the supply pipe 24. In addition, the humidifier 16 collects water contained in an off-gas flowing through the discharge pipe 26 and vaporizes the water into steam. The humidifier 16 may introduce vaporized steam into the supply pipe 24. The off-gas is a mixed gas containing an oxygen-containing gas and water vapor.

The fuel cell stack 18 generates electric power by an electrochemical reaction between hydrogen gas and oxygen-containing gas. The fuel cell stack 18 includes a first input portion 18-1, a first output portion 18-2, a second input portion 18-3, a second output portion 18-4, and a plurality of fuel cells (not shown).

In the fuel cell stack 18, oxygen-containing gas flowing in from the first input portion 18-1 and hydrogen gas flowing in from the second input portion 18-3 are distributed to the respective fuel cells. Each fuel cell generates electric power by an electrochemical reaction between the hydrogen gas and the oxygen-containing gas.

The oxygen-containing gas that does not contribute to the electrochemical reaction of each fuel cell, and water (water vapor) generated by the electrochemical reaction, are collected as an off-gas and discharged from the first output portion 18-2. The hydrogen gas that does not contribute to the electrochemical reaction of each fuel cell is discharged from the second output portion 18-4.

The hydrogen unit 20 includes a hydrogen gas supply passage 20-1 connected to the second input portion 18-3 of the fuel cell stack 18, and a hydrogen gas recovery passage 20-2 connected to the second output portion 18-4 of the fuel cell stack 18.

The hydrogen unit 20 supplies hydrogen gas, which is supplied from a hydrogen tank (not shown) provided outside the case 22, to the fuel cell stack 18 via the hydrogen gas supply passage 20-1. The hydrogen unit 20 resupplies the hydrogen gas, which is supplied from the fuel cell stack 18 via the hydrogen gas recovery passage 20-2, to the fuel cell stack 18 via the hydrogen gas supply passage 20-1. In this case, the hydrogen unit 20 discharges a part of the hydrogen gas to the outside of the case 22 as necessary.

The case 22 encloses the humidifier 16, the fuel cell stack 18, and the hydrogen unit 20. The case 22 is provided with a ventilation hole 220.

The supply pipe 24 is a pipe for guiding oxygen-containing gas, which is supplied from the oxygen-containing gas supply device 12, to the fuel cell stack 18. One end portion of the supply pipe 24 is connected to the oxygen-containing gas supply device 12, and the other end portion of the supply pipe 24 is connected to the first input portion 18-1 of the fuel cell stack 18. The supply pipe 24 extends from the oxygen-containing gas supply device 12 to the fuel cell stack 18 via the intercooler 14, a wall portion 22W of the case 22, and the humidifier 16 in this order.

The discharge pipe 26 is a pipe for guiding the off-gas, which is discharged from the fuel cell stack 18, to the outside of the case 22. One end portion of the discharge pipe 26 is connected to the first output portion 18-2 of the fuel cell stack 18. The other end portion of the discharge pipe 26 is an open end portion, and is disposed outside the case 22. The discharge pipe 26 extends from the fuel cell stack 18 to the outside of the case 22 via the humidifiers 16 and the wall portion 22W of the case 22 in this order.

The fuel cell system 10 further includes a branch flow passage 28, and a bypass flow passage 30. The branch flow passage 28 is a flow passage for guiding oxygen-containing gas, which is supplied from the oxygen-containing gas supply device 12, into the case 22. The branch flow passage 28 branches from the supply pipe 24 and communicates with the inside of the case 22. The bypass flow passage 30 is a flow passage for discharging the oxygen-containing gas, which is supplied from the oxygen-containing gas supply device 12, to the outside without causing the oxygen-containing gas to pass through the fuel cell stack 18. The bypass flow passage 30 is connected to the discharge pipe 26 and the branch flow passage 28.

Figure 2:
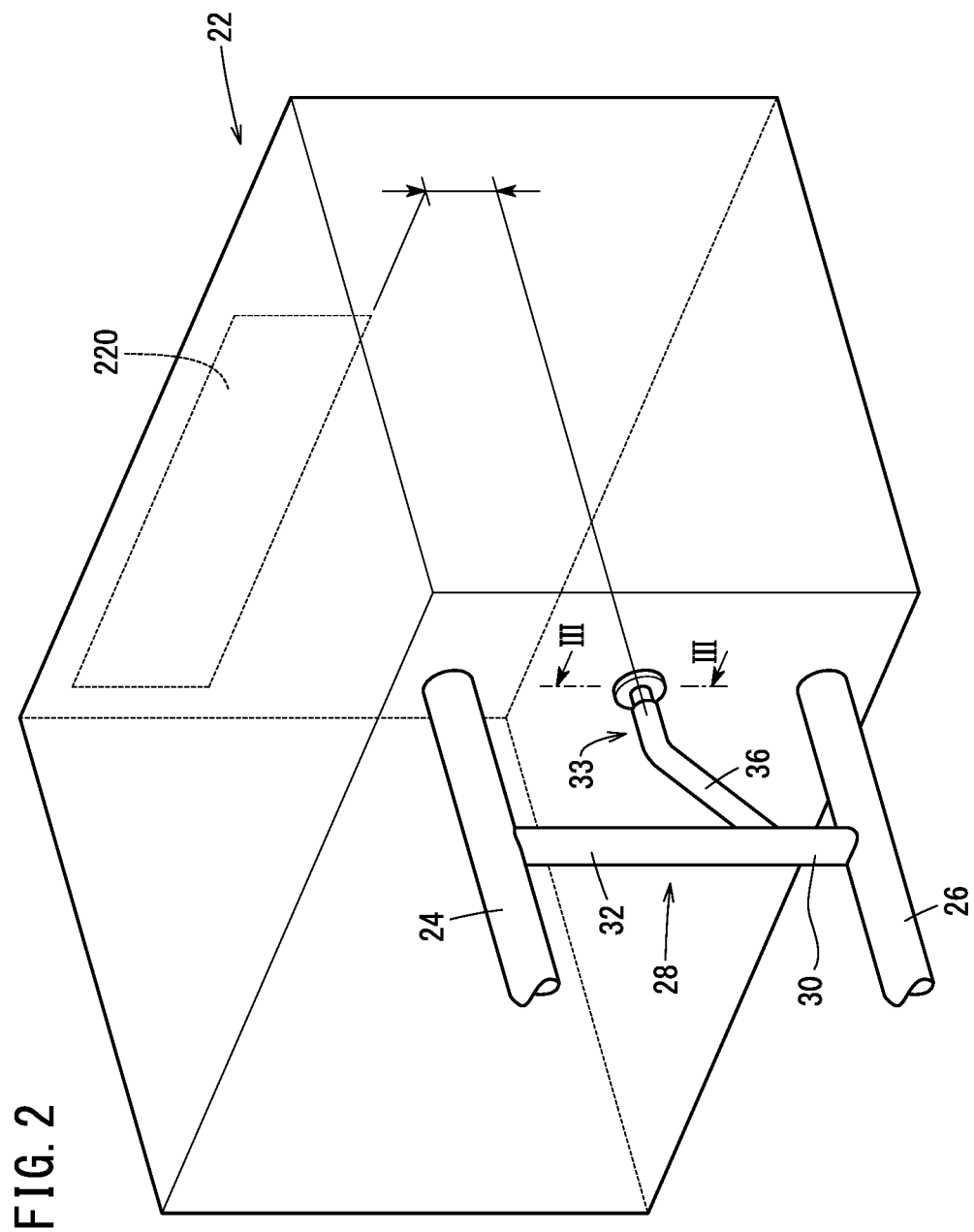
FIG. 2 is an external view showing a branch flow passage and a case in an installed state of the fuel cell system.

FIG. 2 is an external view showing the branch flow passage 28 and the case 22 in an installed state of the fuel cell system 10. The installed state of the fuel cell system 10 refers to a state in which the case 22 is installed at a specified location in the fuel cell system 10. When the case 22 is disposed at the specified location in the fuel cell system 10, power generation can be performed by the fuel cell stack 18.

The branch flow passage 28 includes a first flow passage portion 32, a second flow passage portion 33, and a third flow passage portion 34 (see FIG. 1). The first flow passage portion 32 extends downward from the supply pipe 24. The second flow passage portion 33 extends from the first flow passage portion 32 toward the case 22. The first flow passage portion 32 and the second flow passage portion 33 are disposed outside the case 22, and are constituted by pipes.

The second flow passage portion 33 includes an inclined portion 36. The inclined portion 36 is formed such that its height increases toward an inner surface F1 (FIG. 1) of the wall portion 22W of the case 22 in the installed state of the fuel cell system 10. That is, in the installed state of the fuel cell system 10, the inclined portion 36 is inclined upward toward the inner surface F1 of the wall portion 22W of the case 22.

Figure 3:
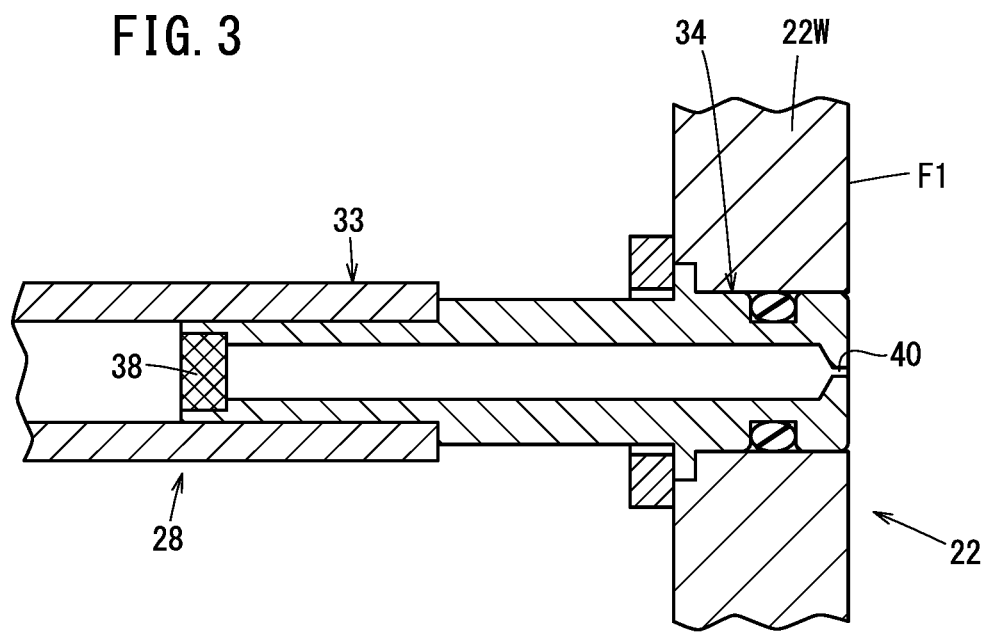
FIG. 3 is a cross-sectional view taken along line III-III of FIG. 2.

The third flow passage portion 34 is disposed in the wall portion 22W of the case 22 (see FIG. 1). FIG. 3 is a cross-sectional view taken along line III-III of FIG. 2. The third flow passage portion 34 is constituted by a pipe inserted into a through hole penetrating the wall portion 22W of the case 22. Note that the third flow passage portion 34 may be a through hole that penetrates the wall portion 22W of the case 22.

The second flow passage portion 33 is provided with a filter 38. The filter 38 prevents foreign matter from flowing into the case 22. The third flow passage portion 34 is provided with a constricted portion 40. The constricted portion 40 forms, in the third flow passage portion 34, a hole (orifice) having a cross-section smaller than the cross-section of the flow passage portion in which the filter 38 is provided. This hole includes an outlet end (outlet opening) of the branch flow passage 28.

The outlet end (outlet opening) of the branch flow passage 28 is disposed on the inner surface F1 of the wall portion 22W of the case 22, and communicates with the inside of the case 22. The outlet end (outlet opening) of the branch flow passage 28 is provided at a position lower than the ventilation hole 220 in the installed state of the fuel cell system 10 (see FIGS. 1 and 2).

Figure 4:
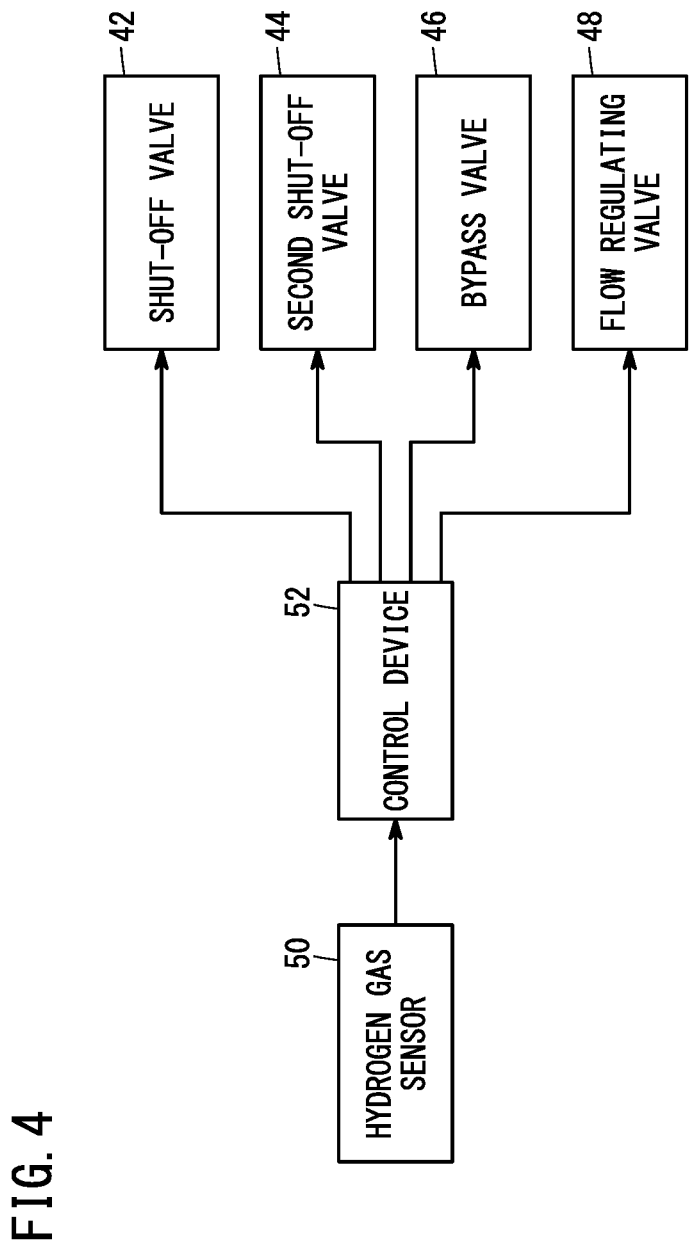
FIG. 4 is a block diagram showing a configuration of a part of the fuel cell system.

FIG. 4 is a block diagram showing a configuration of a part of the fuel cell system 10. The fuel cell system 10 further includes a shut-off valve 42, a second shut-off valve 44, a bypass valve 46, a flow regulating valve 48, a hydrogen gas sensor 50, and a control device 52.

The shut-off valve 42 is a valve capable of blocking the supply pipe 24. This valve may be an on-off valve capable of opening and closing the flow passage, or may be an opening degree adjustment valve capable of adjusting the opening degree of the flow passage. When the opening degree of the opening degree adjustment valve is minimum (0), the flow passage is closed, and the fluid does not flow. On the other hand, as the opening degree of the opening degree adjustment valve increases, the flow rate increase.

The shut-off valve 42 is provided in the supply pipe 24 (see FIG. 1). FIG. 1 shows an example of a case in which the shut-off valve 42 is provided in the supply pipe 24 disposed in the wall portion 22W of the case 22. The shut-off valve 42 is provided downstream of a branch point of the supply pipe 24 (an input end of the first flow passage portion 32) from which the branch flow passage 28 branches. That is, the branch flow passage 28 branches from the supply pipe 24 positioned upstream of the shut-off valve 42.

The second shut-off valve 44 is a valve capable of blocking the discharge pipe 26. This valve may be an on-off valve or an opening degree adjustment valve. The second shut-off valve 44 is provided in the discharge pipe 26 (see FIG. 1). FIG. 1 shows an example of a case in which the second shut-off valve 44 is provided in the discharge pipe 26 disposed inside the case 22. The second shut-off valve 44 is provided upstream of a connection point of the discharge pipe 26 (an outlet end of the bypass flow passage 30) to which the bypass flow passage 30 is connected.

The bypass valve 46 is an opening degree adjustment valve for regulating the flow rate of oxygen-containing gas flowing through the bypass flow passage 30. The bypass valve 46 is provided in the bypass flow passage 30 (see FIG. 1).

The flow regulating valve 48 is an opening degree adjustment valve for regulating the flow rate of oxygen-containing gas flowing through the branch flow passage 28. The flow regulating valve 48 is provided in the inclined portion 36 (see FIG. 1).

The hydrogen gas sensor 50 is a sensor that detects the concentration of hydrogen gas inside the case 22. The hydrogen gas sensor 50 is provided inside the case 22 (see FIG. 1).

The control device 52 is a device that controls the fuel cell system 10. The control device 52 may be provided outside the case 22, or may be provided inside the case 22.

The control device 52 controls the hydrogen unit 20 to supply hydrogen gas to the fuel cell stack 18, and adjust the amount of the hydrogen gas supplied to the fuel cell stack 18.

Figure 5:
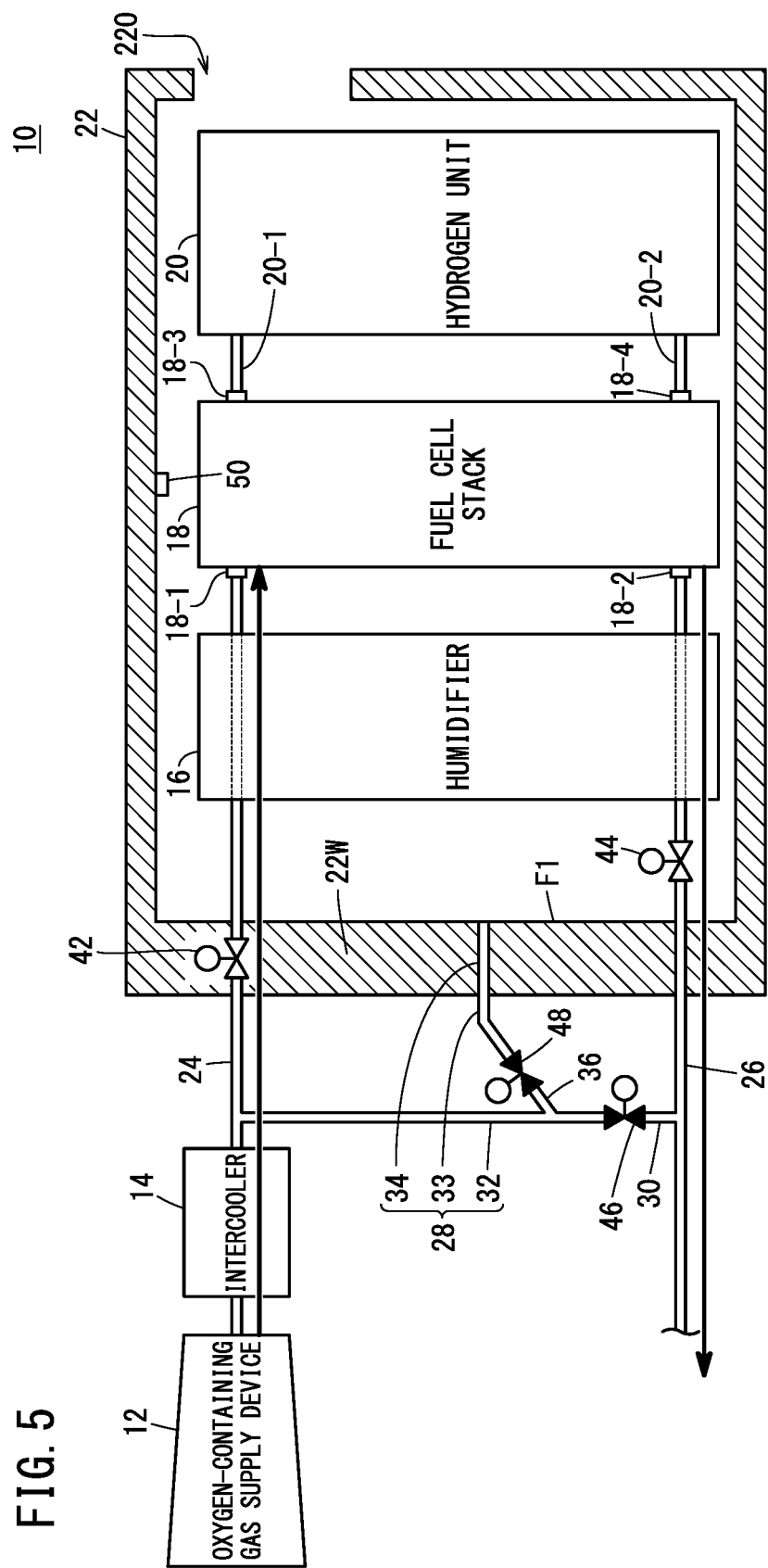
FIG. 5 is a diagram showing a flow of an oxygen-containing gas.

FIG. 5 is a diagram showing the flow of oxygen-containing gas. The control device 52 controls the oxygen-containing gas supply device 12, the shut-off valve 42, the second shut-off valve 44, the bypass valve 46, and the flow regulating valve 48 to supply oxygen-containing gas to the fuel cell stack 18. In this case, the control device 52 controls the oxygen-containing gas supply device 12 to output the oxygen-containing gas to the supply pipe 24. Further, the control device 52 opens the shut-off valve 42 and the second shut-off valve 44, and closes the bypass valve 46 and the flow regulating valve 48. As a result, the oxygen-containing gas output to the supply pipe 24 is supplied to the fuel cell stack 18 from the first input portion 18-1. The oxygen-containing gas supplied to the fuel cell stack 18 is distributed to the individual fuel cells. The off-gas containing the oxygen-containing gas that does not contribute to the electrochemical reaction of each fuel cell flows out to the discharge pipe 26 from the first output portion 18-2, and is discharged to the outside via the discharge pipe 26.

Figure 6:
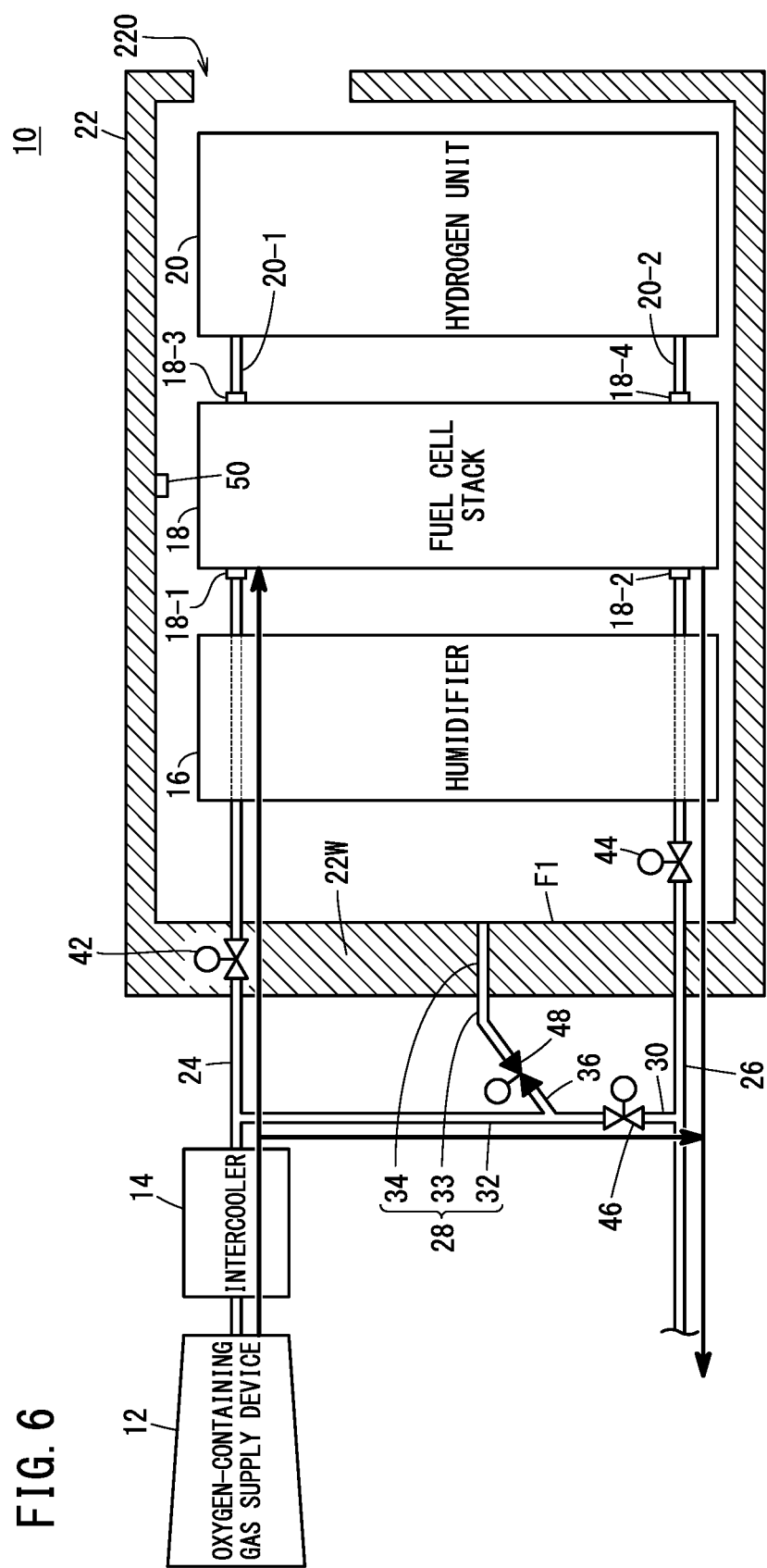
FIG. 6 is a diagram showing the flow of the oxygen-containing gas when the supply amount of the oxygen-containing gas is adjusted.

FIG. 6 is a diagram showing the flow of the oxygen-containing gas when the supply amount of the oxygen-containing gas is adjusted. The control device 52 controls the bypass valve 46 to adjust the amount of the oxygen-containing gas supplied to the fuel cell stack 18. In this case, the control device 52 determines a target power generation amount based on at least one of the temperature, the voltage, or the generated power of the fuel cell stack 18, and varies the opening degree of the bypass valve 46 in accordance with the target power generation amount. The control device 52 increases the opening degree of the bypass valve 46 as the target power generation amount decreases. As a result, a part of the oxygen-containing gas flowing through the supply pipe 24 flows into the discharge pipe 26 through the branch flow passage 28 and the bypass flow passage 30, and the amount of the oxygen-containing gas supplied to the fuel cell stack 18 is adjusted.

Figure 7:
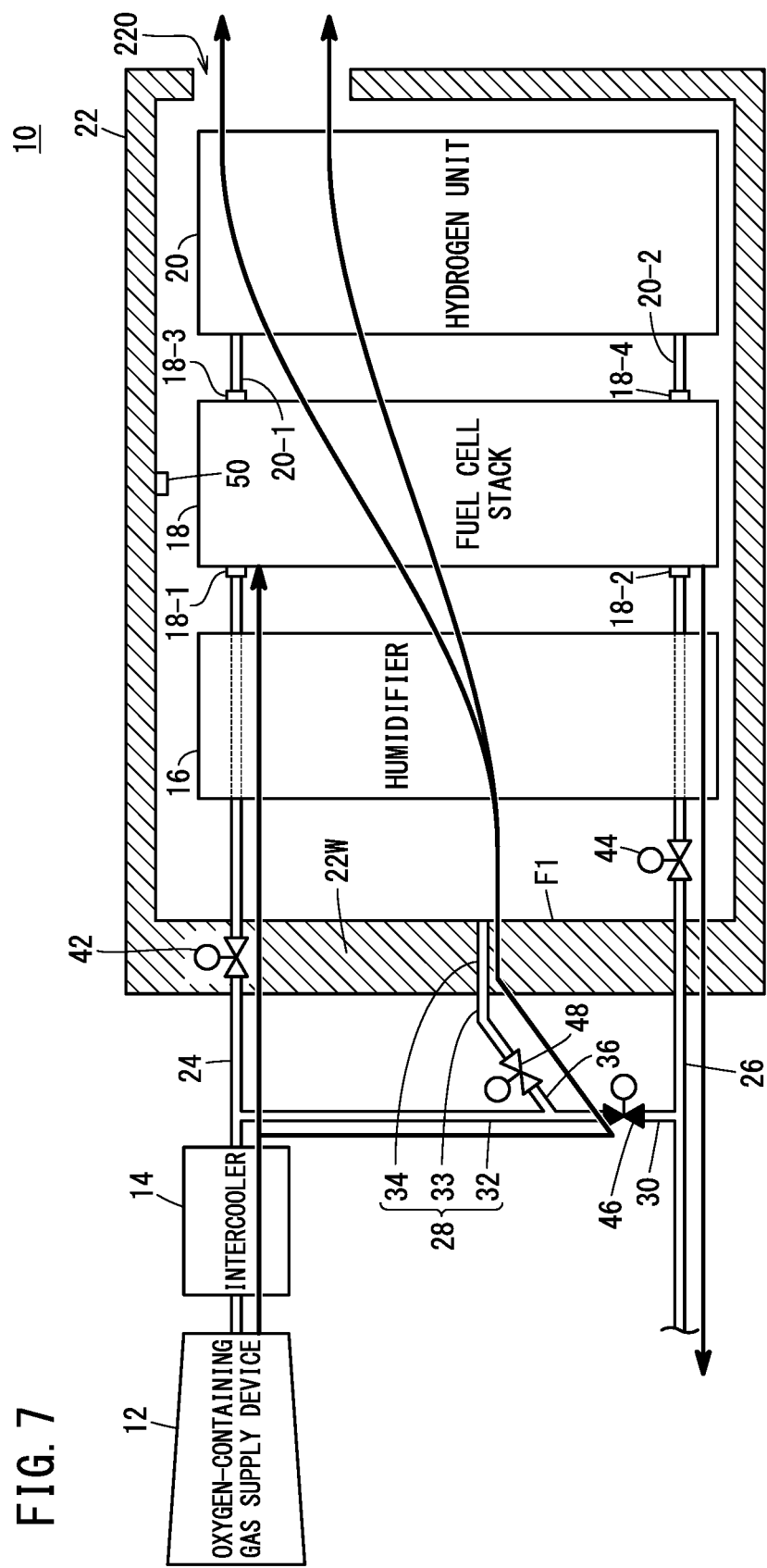
FIG. 7 is a diagram showing the flow of the oxygen-containing gas when the oxygen-containing gas is supplied to the case.

The control device 52 ventilates the inside of the case 22 based on the hydrogen gas detected by the hydrogen gas sensor 50 during power generation of the fuel cell stack 18. FIG. 7 is a diagram showing the flow of the oxygen-containing gas when the oxygen-containing gas is supplied to the case 22. FIG. 7 shows an example of a case in which the bypass valve 46 is closed.

When the concentration of hydrogen gas detected by the hydrogen gas sensor 50 exceeds a predetermined threshold value, the control device 52 opens the flow regulating valve 48. In this case, the control device 52 sets the opening degree of the flow regulating valve 48 in accordance with the concentration of the hydrogen gas. As a result, a part of the oxygen-containing gas flowing through the supply pipe 24 passes through the branch flow passage 28, and flows into the case 22 from the outlet end (outlet opening) of the branch flow passage 28. The oxygen-containing gas having flowed into the case 22 is discharged to the outside of the case 22 through the ventilation hole 220 provided in the case 22.

In the present embodiment, the outlet end (outlet opening) of the branch flow passage 28 is provided at a position lower than the ventilation hole 220 in the installed state of the fuel cell system 10 (see FIG. 7). Therefore, a flow of the oxygen-containing gas from the lower side to the upper side of the case 22 is formed. Accordingly, the hydrogen gas, which tends to stay in the upper portion of the case 22, can be efficiently discharged to the outside of the case 22.

When the flow regulating valve 48 is opened, the amount of oxygen-containing gas required for power generation (the amount of oxygen-containing gas corresponding to the target power generation amount) is reduced by the amount of oxygen-containing gas supplied into the case 22. Therefore, when the flow regulating valve 48 is opened, the control device 52 controls the oxygen-containing gas supply device 12 to increase the amount of oxygen-containing gas to be output to the supply pipe 24 more than before the flow regulating valve 48 is opened.

The amount of oxygen-containing gas supplied into the case 22 can be acquired based on the opening degree of the flow regulating valve 48. Specifically, the control device 52 acquires the amount of the oxygen-containing gas supplied into the case 22 based on a table or a relational expression indicating a relationship between the amount of the oxygen-containing gas supplied into the case 22 and the opening degree of the flow regulating valve 48.

Further, the amount of oxygen-containing gas required for power generation (the amount of oxygen-containing gas corresponding to the target power generation amount) can be acquired based on the target power generation amount. Specifically, the control device 52 acquires the amount of the oxygen-containing gas required for power generation by using a table or a relational expression indicating a relationship between the target power generation amount and the amount of the oxygen-containing gas required for power generation.

Even if the concentration of hydrogen gas detected by the hydrogen gas sensor 50 does not exceed the predetermined threshold value, when the amount of oxygen-containing gas required for power generation is relatively small, oxygen-containing gas can be supplied to the case 22. Therefore, when the concentration of the hydrogen gas detected by the hydrogen gas sensor 50 is equal to or less than the predetermined threshold value and the amount of the oxygen-containing gas required for power generation is equal to or less than a predetermined amount, the control device 52 opens the flow regulating valve 48. As a result, the inside of the case 22 can be actively ventilated without limiting the power generation of the fuel cell stack 18.

On the other hand, even if the concentration of the hydrogen gas detected by the hydrogen gas sensor 50 does not exceed the predetermined threshold value, when the amount of the oxygen-containing gas required for power generation is relatively large, there is a case that the oxygen-containing gas cannot be supplied to the case 22. Therefore, when the concentration of the hydrogen gas detected by the hydrogen gas sensor 50 is equal to or less than the predetermined threshold value and the amount of the oxygen-containing gas required for power generation exceeds the predetermined amount, the control device 52 controls the flow regulating valve 48 to make the flow rate of the oxygen-containing gas supplied to the case 22 lower than the current flow rate. Thus, when the concentration of the hydrogen gas in the case 22 is low and the fuel cell stack 18 needs to exhibit high output, the oxygen-containing gas can be preferentially supplied to the fuel cell stack 18. As a result, the hydrogen gas in the case 22 can be discharged to the outside without lowering the power generation efficiency.

Figure 8:
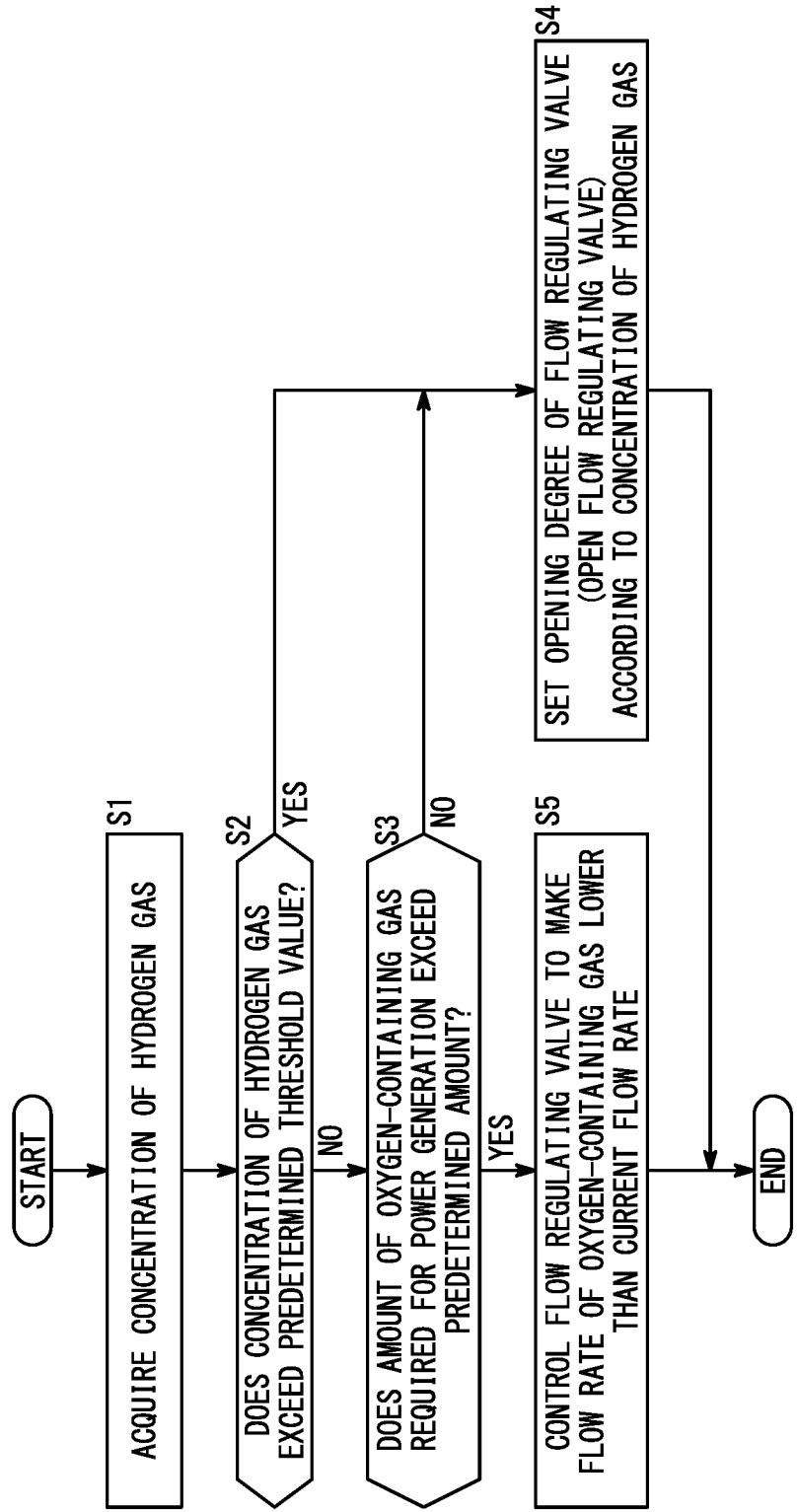
FIG. 8 is a flowchart showing a procedure of a ventilation process performed by a control device.

FIG. 8 is a flowchart showing a procedure of a ventilation process performed by the control device 52. The ventilation process is repeatedly performed at a predetermined cycle.

In step S1, the control device 52 acquires the concentration of hydrogen gas detected by the hydrogen gas sensor 50. When the concentration of hydrogen gas is acquired, the ventilation process proceeds to step S2.

In step S2, the control device 52 compares the concentration of hydrogen gas with a predetermined threshold value. When the concentration of the hydrogen gas is equal to or less than the threshold value (step S2: NO), the ventilation process proceeds to step S3. On the other hand, when the concentration of the hydrogen gas exceeds the threshold value (step S2: YES), the ventilation process proceeds to step S4.

In step S3, the control device 52 compares the amount of oxygen-containing gas required for power generation (the amount of oxygen-containing gas corresponding to the target power generation amount) with a predetermined amount. When the amount of the oxygen-containing gas required for power generation is equal to or less than the predetermined amount (step S3: NO), the ventilation process proceeds to step S4. On the other hand, when the amount of the oxygen-containing gas required for power generation exceeds the predetermined amount (step S3: YES), the ventilation process proceeds to step S5.

In step S4, the control device 52 opens the flow regulating valve 48. In this case, the control device 52 sets the opening degree of the flow regulating valve 48 in accordance with the concentration of hydrogen gas. When the flow regulating valve 48 is opened, the ventilation process ends.

In step S5, the control device 52 controls the flow regulating valve 48 to make the flow rate of the oxygen-containing gas supplied to the case 22 lower than the current flow rate. When the flow rate of the oxygen-containing gas is reduced, the ventilation process ends.

The above-described embodiment may be modified as follows.

(Modification 1)

The outlet end (outlet opening) of the branch flow passage 28 may be disposed inside the case 22. In this case, the third flow passage portion 34 is constituted by a pipe inserted into a through hole that penetrates the wall portion 22W of the case 22, and this pipe protrudes into the case 22.

(Modification 2)

The branch flow passage 28 may branch from the supply pipe 24 that is disposed in the wall portion 22W of the case 22. In this case, the branch flow passage 28 can be constituted only by a through hole that penetrates the wall portion 22W of the case 22.

(Modification 3)

In the installed state of the fuel cell system 10, the entire outlet end (outlet opening) of the branch flow passage 28 may not be provided at a position lower than the ventilation hole 22O. Specifically, in the installed state of the fuel cell system 10, a part of the outlet end (outlet opening) of the branch flow passage 28 may be provided at a position higher than the lowest portion of the ventilation hole 22O. In this case, in the ventilation hole 22O, a region positioned higher than the outlet end (outlet opening) of the branch flow passage 28 is larger than a region positioned lower than the outlet end (outlet opening).

(Modification 4)

The inclined portion 36 may be provided in the third flow passage portion 34 instead of the second flow passage portion 33. Further, the inclined portion 36 may also be provided in the third flow passage portion 34 in addition to the second flow passage portion 33. In this case, the inclined portion 36 provided in the third flow passage portion 34 may be formed continuously with the inclined portion 36 provided in the second flow passage portion 33, or may be formed discontinuously with the inclined portion 36 provided in the second flow passage portion 33.

(Modification 5)

The bypass flow passage 30 may be connected to the supply pipe 24 and the discharge pipe 26. In this case, both the branch flow passage 28 and the bypass flow passage 30 branch from the supply pipe 24. The bypass flow passage 30 may branch from the supply pipe 24 upstream of the position at which the branch flow passage 28 branches, or may branch from the supply pipe 24 downstream of the position at which the branch flow passage 28 branches.

(Modification 6)

The hydrogen gas sensor 50 may detect the amount (absolute amount) of hydrogen gas. In this case, the control device 52 opens the flow regulating valve 48 when the amount of hydrogen gas detected by the hydrogen gas sensor 50 exceeds a predetermined threshold value.

(Modification 7)

The control device 52 may increase the opening degree of the flow regulating valve 48 as the concentration of hydrogen gas (or the amount of hydrogen gas) detected by the hydrogen gas sensor 50 increases. Specifically, the control device 52 increases the flow rate of hydrogen gas supplied to the case 22 as the concentration of the hydrogen gas (or the amount of the hydrogen gas) increases. In this case, it is not necessary to compare the concentration of hydrogen gas (or the amount of hydrogen gas) detected by the hydrogen gas sensor 50 with the predetermined threshold value.

(Modification 8)

The above-described embodiment and modifications may be arbitrarily combined without departing from the object of the present invention.

The invention and effects that can be grasped from the above description will be described below.

(1) The present invention provides the fuel cell system (10) comprising: the fuel cell stack (18) configured to generate electric power by electrochemical reaction between the hydrogen gas and the oxygen-containing gas; the case

(22) configured to enclose the fuel cell stack; the supply pipe (24) connected to the oxygen-containing gas supply device (12) provided outside the case and to the fuel cell stack, the supply pipe (24) passing through the wall portion (22W) of the case; the branch flow passage (28) that branches from the supply pipe disposed outside the inner surface (F1) of the wall portion of the case, and communicates with the inside of the case; and the ventilation hole (220) provided in the case and configured to ventilate the inside of the case to release the hydrogen gas. The outlet end of the branch flow passage is provided at a position lower than the ventilation hole in the installed state of the fuel cell system.

With this configuration, the inside of the case can be efficiently ventilated. Specifically, since the branch flow passage that branches from the supply pipe and communicates with the inside of the case is provided, oxygen-containing gas can be guided to the case without a ventilation fan. In addition, since the outlet end of the branch flow passage is provided at a position lower than the ventilation hole in the installed state of the fuel cell system, a flow of the oxygen-containing gas from the lower side to the upper side of the case is formed. Therefore, it is possible to efficiently discharge the hydrogen gas, which tends to stay in the upper portion of the case, to the outside of the case.

(2) The fuel cell system of the present invention may further comprise the shut-off valve (42) provided in the supply pipe, and the branch flow passage may branch from the supply pipe positioned upstream of the shut-off valve. With this configuration, when the power generation of the fuel cell stack is stopped, even if the water remaining in the supply pipe between the shut-off valve and the fuel cell stack freezes and the shut-off valve becomes inoperable, the inside of the case can be ventilated.

(3) In the fuel cell system of the present invention, the branch flow passage may include the inclined portion (36) inclined upward toward the inner surface of the wall portion of the case in the installed state of the fuel cell system. With this configuration, moisture such as dew condensation generated upstream of the inclined portion can be prevented from flowing into the case.

(4) The fuel cell system of the present invention may further comprise the discharge pipe (26) configured to discharge the off-gas from the fuel cell stack, and the bypass flow passage (30) configured to connect the branch flow passage and the discharge pipe. With this configuration, a part of the branch flow passage can be used both as a flow passage for flow to the case and a flow passage for flow to the discharge pipe.

(5) The fuel cell system of the present invention may further comprise: the hydrogen gas sensor (50) configured to detect the hydrogen gas inside the case; the flow regulating valve (48) provided in the branch flow passage and configured to regulate the flow rate of the oxygen-containing gas flowing into the case; and the control device (52) configured to control the flow regulating valve based on the amount or the concentration of the hydrogen gas detected by the hydrogen gas sensor to regulate the flow rate of the oxygen-containing gas. This makes it possible to adjust the amount of ventilation inside the case.

(6) In the fuel cell system of the present invention, the control device may increase the flow rate of the oxygen-containing gas as the amount or the concentration of the hydrogen gas increases. With this configuration, the inside of the case can be ventilated with the oxygen-containing gas in an amount corresponding to the amount or the concentration of the hydrogen gas.

(7) In the fuel cell system of the present invention, the control device may open the flow regulating valve when the amount or the concentration of the hydrogen gas exceeds the threshold value. With this configuration, the inside of the case can be ventilated only when necessary.

(8) In the fuel cell system of the present invention, the flow regulating valve may be provided in the inclined portion. By providing the flow regulating valve in the inclined portion where water is less likely to stagnate, it is possible to prevent the flow regulating valve from becoming inoperable due to freezing of the dew condensation water.

(9) In the fuel cell system of the present invention, when the amount or the concentration of the hydrogen gas is equal to or less than the threshold value and the amount of the oxygen-containing gas required for power generation exceeds the predetermined amount, the control device may makes the flow rate of the oxygen-containing gas lower than the current flow rate. With this configuration, when the concentration of the hydrogen gas in the case is low and the fuel cell stack needs to exhibit high output, the oxygen-containing gas can be preferentially supplied to the fuel cell stack. As a result, the hydrogen gas in the case can be discharged to the outside without lowering the power generation efficiency.

The present invention is not limited to the above disclosure, and various modifications are possible without departing from the essence and gist of the present invention.

What is claimed is:

1. A fuel cell system comprising:
    a fuel cell stack configured to generate electric power by an electrochemical reaction between a hydrogen gas and an oxygen-containing gas;
    a case configured to enclose the fuel cell stack;
    a supply pipe connected to an oxygen-containing gas supply device provided outside the case and to the fuel cell stack, the supply pipe passing through a wall portion of the case;
    a branch flow passage configured to branch from the supply pipe disposed outside an inner surface of the wall portion of the case, and communicate with an inside of the case;
    a ventilation hole provided in the case and configured to ventilate the inside of the case to release the hydrogen gas;
    a discharge pipe configured to discharge an off-gas from the fuel cell stack; and
    a bypass flow passage configured to connect the branch flow passage and the discharge pipe, wherein
    an outlet end of the branch flow passage is provided at a position lower than the ventilation hole in a state where the fuel cell system is installed.

2. The fuel cell system according to claim 1, further comprising:
    a hydrogen gas sensor configured to detect the hydrogen gas in the case;
    a flow regulating valve provided in the branch flow passage and configured to regulate a flow rate of the oxygen-containing gas flowing into the case; and
    a control device configured to control the flow regulating valve based on an amount or a concentration of the hydrogen gas detected by the hydrogen gas sensor to regulate the flow rate of the oxygen-containing gas.

3. The fuel cell system according to claim 2, wherein the control device increases the flow rate of the oxygen-containing gas as the amount or the concentration of the hydrogen gas increases.

4. The fuel cell system according to claim 2, wherein
the control device opens the flow regulating valve when the amount or the concentration of the hydrogen gas exceeds a threshold value.

5. The fuel cell system according to claim 2, wherein
the flow regulating valve is provided in the inclined portion.

6. The fuel cell system according to claim 2, wherein
when the amount or the concentration of the hydrogen gas is equal to or less than a threshold value and when an amount of the oxygen-containing gas required for power generation exceeds a predetermined amount, the control device makes the flow rate of the oxygen-containing gas lower than a current flow rate of the oxygen-containing gas.

7. The fuel cell system according to claim 1, further comprising a shut-off valve provided in the supply pipe, wherein
the branch flow passage branches from the supply pipe positioned upstream of the shut-off valve.

8. The fuel cell system according to claim 1, wherein the branch flow passage includes an inclined portion inclined upward toward the inner surface of the wall portion of the case in the state where the fuel cell system is installed.

* * * * *